Feb. 10, 1942.  H. M. RUNDLE  2,272,622
ADVERTISING DEVICE
Filed Sept. 29, 1939  3 Sheets-Sheet 1

INVENTOR.
Henry M. Rundle
BY
Leonard L. Kalish
ATTORNEY.

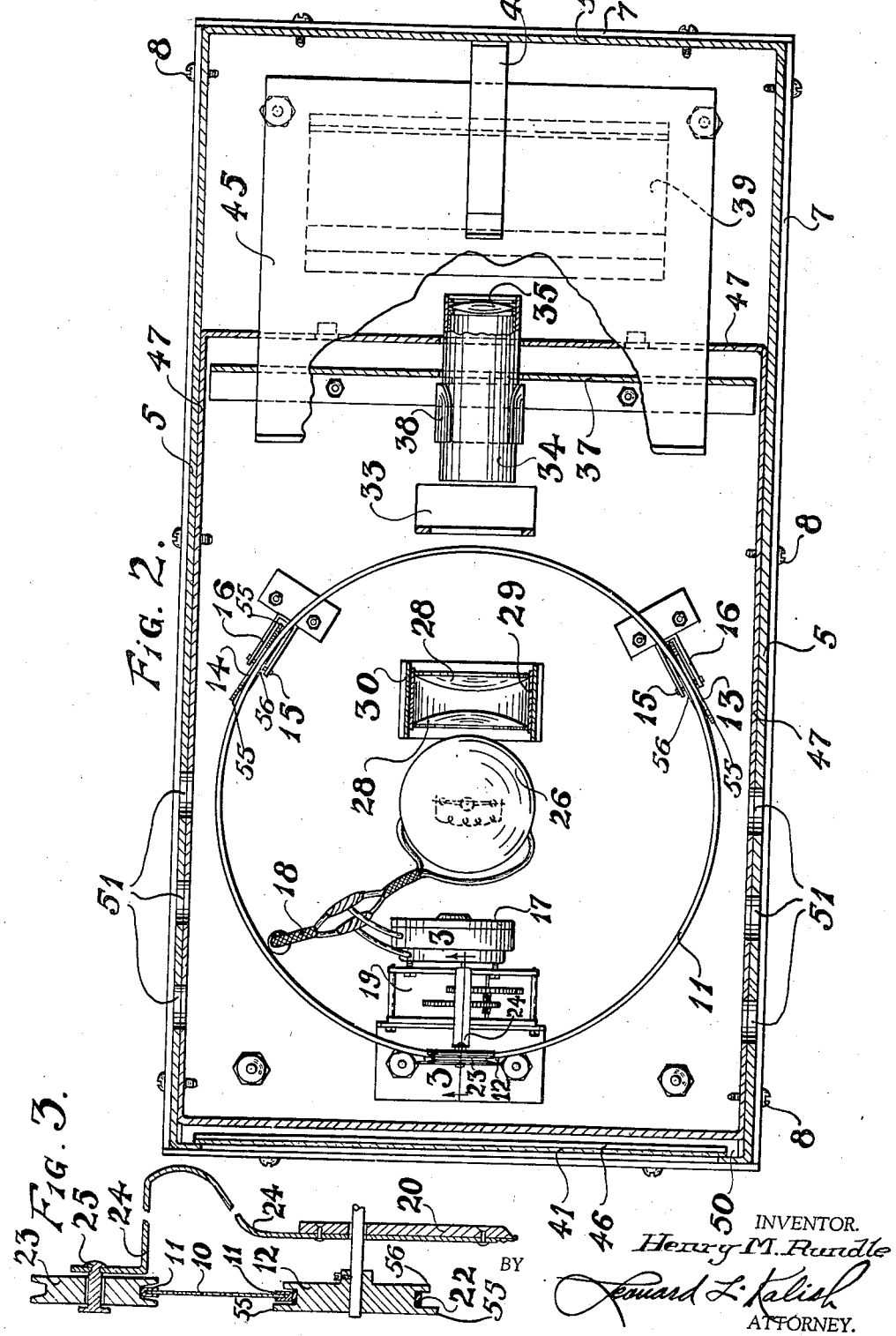

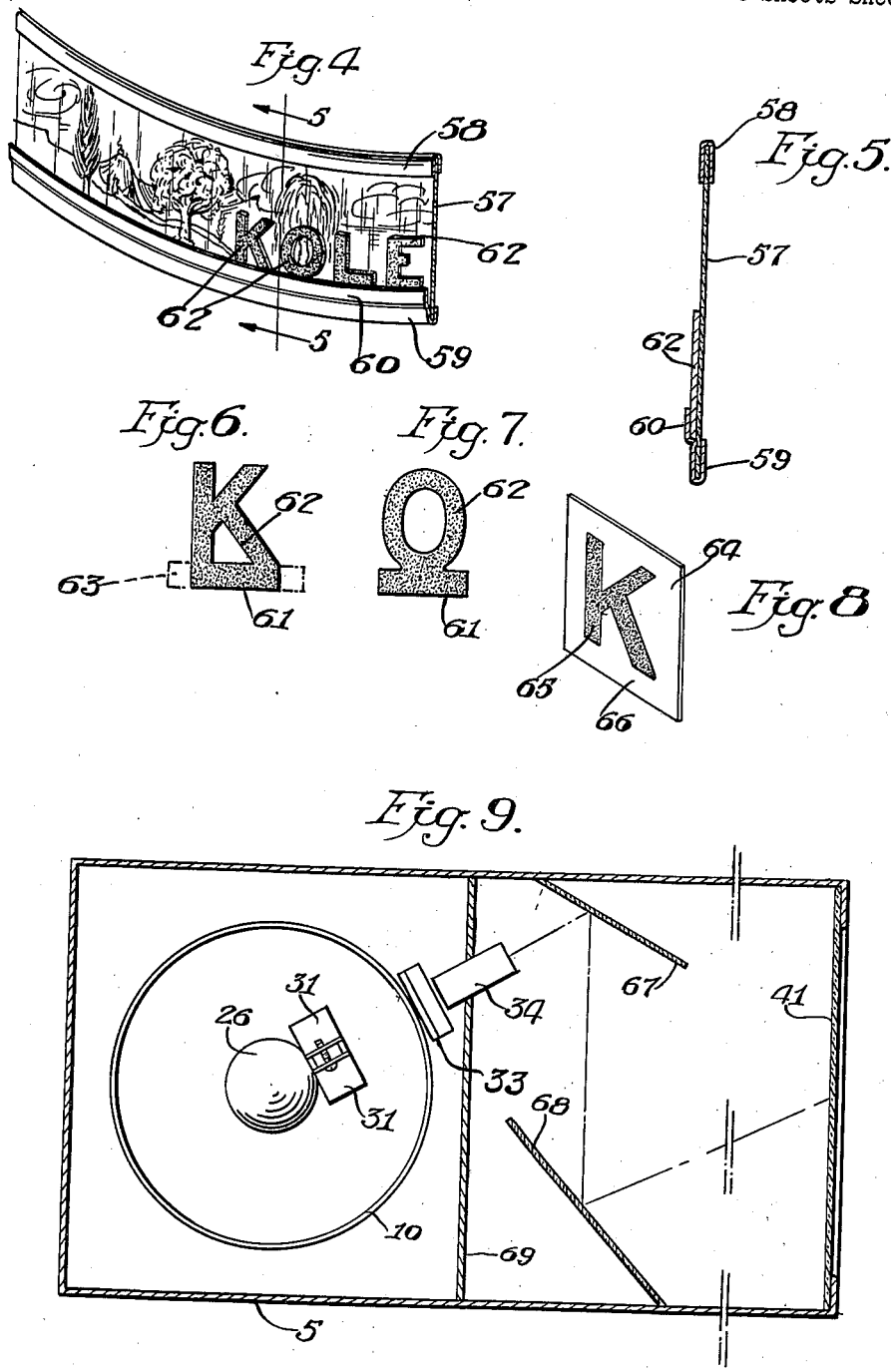

Patented Feb. 10, 1942

2,272,622

UNITED STATES PATENT OFFICE 2,272,622

ADVERTISING DEVICE

Henry M. Rundle, Moorestown, N. J.

Application September 29, 1939, Serial No. 297,044

8 Claims. (Cl. 88—27)

The present invention relates to advertising or display devices in general, and it relates more particularly to advertising devices wherein images are projected onto a viewing screen.

One of the objects of the present invention is the provision of an improved compact advertising device of durable and yet inexpensive construction, which can be quickly and easily assembled and dis-assembled, and which constitutes an effective medium for attracting and holding the attention of passersby, and wherein the possibility of interruption in operation by wear or break-down or improper functioning of moving parts is minimized.

Other objects will appear more fully from the following detailed description, accompanying drawings, and appended claims.

For the purpose of illustrating the invention, there is shown in the accompanying drawings forms thereof which is at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the drawings, in which like reference characters indicate like parts.

Figure 2 represents a plan view of the inside layout of the advertising device illustrated in Figure 1, such as would be seen, for instance, on broken line 2—2 of Figure 1, looking in the direction of the arrows.

Figure 3 represents an enlarged fragmentary sectional view taken on line 3—3 of Figure 2, looking in the direction of the arrows.

Figure 4 represents a fragmentary perspective view of a modified image-bearing cylinder having both fixed images and changeable images, which cylinder may be employed in the advertising device illustrated in the preceding figures in lieu of the cylinder there shown.

Figure 5 represents an enlarged sectional view through this modified cylinder, taken on line 5—5 of Figure 4, looking in the direction of the arrows.

Figure 6 represents an enlarged front elevational view of one of the removable images borne by the cylinder illustrated in Figure 4.

Figure 7 represents an enlarged front elevational view of another one of the removable images borne by the cylinder illustrated in Figure 4.

Figure 8 represents a perspective view of another form of removable image which may be mounted on the cylinder illustrated in Figure 4.

Figure 9 represents a much-simplified diagrammatic plan view of the inside layout of another embodiment of the present invention.

Figure 1:
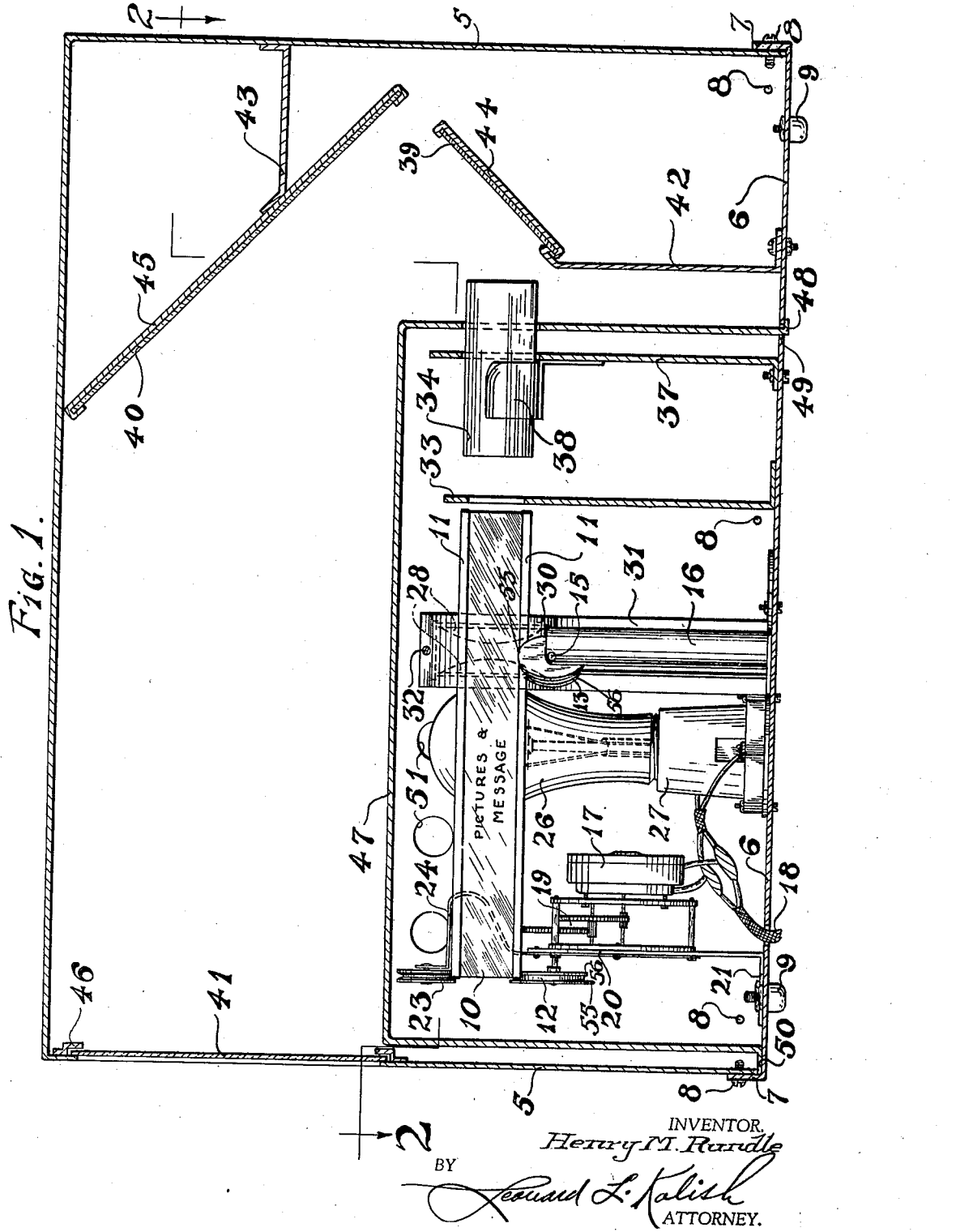
Figure 1 represents a longitudinal sectional view taken through an advertising device constituting an illustrative embodiment of the present invention.

In the particular embodiment of the present invention illustrated in Figures 1 and 2 of the accompanying drawings, the various elements of the advertising device are enclosed in a generally rectangular box-like outer housing 5, which may be formed of sheet-metal or cardboard or indeed of any other suitable material. The housing 5 is preferably provided with a removable base 6, whose outer edges may be upwardly flanged as at 7 to overlap the lower marginal portions of the housing 5. Suitable means are preferably provided for detachably securing the housing 5 to its base 6, as for instance sheet-metal screws 8 or the like. If desired, base 6 may rest on stubs 9, which may be constructed from some yieldable material, such as rubber or the like.

Inside the housing 5, an annulus or cylindrical strip of film 10, which bears a series of images to be projected onto a viewing screen, is rotatably supported in a generally horizontal plane. The annulus 10 may be formed from a single strip of film having its extreme transverse end-portions brought together or overlapped to form an endless image-bearing cylinder, or it may be formed from a plurality of strips of film connected end-to-end to form a composite continuous strip having its extreme end-portions secured together to form the cylinder 10. In either case, however, one or both of the opposed longitudinal edges of the film which comprises this cylinder 10 may be bound with metal channel strips 11, 11, which reinforce and protect the edges of the film, and aid in effecting rotary movement of the cylinder 10.

The film-cylinder 10 may be rotatably supported by three or more rotatably-mounted transversely-fixed wheels 12, 13 and 14, each grooved along its outer periphery to receive the lower channel 11 of the cylinder 10. In the preferred embodiment, the groove-bordering wheel flanges 55 which lie outside the lower channel-strip 11 are preferably relatively large in diameter, so as to confine or fence-in the cylinder 10, whereas those groove-bordering wheel flanges 56 which lie inside the lower channel-strip 11 are preferably relatively small in diameter so as not to interfere with the rotary movement of the cylinder 10 and yet guide it in its path of rotation.

All of the wheels but one, as for instance the wheels 13 and 14, may be merely idler-wheels, each rotatably mounted on a horizontal shaft 15 whose opposite ends may be journalled in suitable openings in the juxtaposed walls of an upright channel member 16. However, one of the supporting wheels, as for instance wheel 12, is preferably driven by a motor, thereby frictionally to rotate the image-bearing film-cylinder 10. Thus, in the illustrated embodiment, a synchronous electric motor 17, which draws its current from an electrical conductor 18, is connected with the cylinder-driving wheel 12 through an intermediate speed-reducing gear-train indicated generally by the numeral 19. If desired, the driving-wheel 12, speed-reducing unit 19, and driving motor 17, may all be mounted on or supported by the same upright supporting member 20, whose perpendicularly bent lower end 21 may be secured to the base 6 by being bolted thereto, or by any other suitable means.

In order to increase the friction between the driving-wheel 12 and the film-cylinder 10, the grooved tread portion of the driving-wheel may be covered with an annular strip of rubber 22, as more particularly illustrated in Figure 3.

If desired, an overhead idler-wheel 23 may be disposed directly above the driving-wheel 12 on the opposite side of cylinder 10. This idler-wheel 23 may be grooved along its outer periphery like the supporting wheels, and engages and guides the top cylinder channel-strip 11 as the latter rotates.

Wheel 23 may be urged downwardly onto the film-cylinder 10 to increase the traction between the driving-wheel 12 and said cylinder. Thus, idler-wheel 23 may be urged downwardly against the cylinder 10 by a curved leaf spring 24, whose lower end may be riveted or otherwise fixedly secured to the support 20, and whose upper end may bear the shaft 25 on which the idler-wheel 23 rotates.

An incandescent electric lamp 26, which may be screwed into any suitable lamp-socket 27, projects upwardly into the cylinder 10, and provides a source of illumination for the images on the cylinder. Light emitted from this lamp 26 may be concentrated by means of one or more co-axial condenser lenses 28, and may then be passed through the image-bearing film 10 into the lens-bearing tube 34 which houses the projecting lens or lenses.

The condenser lenses 28 may be operatively supported intermediate the lamp 26 and that portion of the cylinder 10 which is to be projected, in any suitable manner. In the illustrated embodiment, these condenser lenses 28 are disposed inside a ring 29 which is securely clamped between a pair of semi-circularly shaped strap-members 30. These members 30 may be held at a proper height above the bottom 6 by intervening supports 31, which may, if desired, be formed integrally with the straps 30. A screw 32 connects the upper ends of the lens-encircling strap-members 30, and provides ready means whereby the straps may be loosened or tightened, to permit ready adjustment or replacement of the condenser lenses 28.

The cylinder field illuminated by the light from the condenser lenses 28 may be framed before projection by a flat plate 33 which bears a rectangular framing aperture in alignment with the optical axis. This framing member 33 may be operatively supported in any suitable manner, as for instance by being welded or bolted to the base 6.

The light passing through the plate 33 then enters the lens-bearing tube 34, which houses three projector lenses 35, only one of which is shown in the drawings. The particular number and arrangement of projector lenses may be varied to suit individual requirements. In the illustrated embodiment, the projector lens or train of lenses 35 is housed within an axially slidable tubular lens-mount 34, which may be operatively supported at its proper distance above the base 6 by means of a supporting member 37, whose lower end may be bolted to said bottom, and whose upper portion may be provided with a spring-clamp cradle 38 which frictionally receives the tube 34. Adjustments in focus may be effected by seizing the front end of tube 34 (which projects exteriorly of an inner casing 47) and sliding the tube 34 inwardly or outwardly in its cradle 38.

The projecting lenses 35 enlarge the images and may cast them rearwardly onto an upwardly inclined mirror 39, from whence they may be reflected upwardly onto a downwardly inclined mirror 40, which in turn may reflect the images forwardly, casting them forwardly onto a translucent viewing screen 41. These mirrors 39 and 40 may be operatively supported inside the housing 5 by suitable brackets 42 and 43, which may be welded or bolted to the walls of the housing, and which may be formed integrally with or secured to sheet-metal mirror-backings 44 and 45, whose outer edges may be crimped over the edges of the mirrors.

The translucent viewing screen 41 may be disposed immediately behind a suitable rectangular opening formed in the front wall of the housing 5, and may be held in position by any suitable means, as for instance, by having its edges confined in channel strips 46, or by adhesive means, or the like. The screen 41 may be made from any suitable translucent material, such as frosted Celluloid, translucent paper, Cellophane or cloth, frosted, ground or etched glass, or the like.

Inside the outer housing 5, an inner casing 47 may be provided for encasing the image-projecting means and for shielding stray light from the viewing screen 41. This inner casing 47 is positioned so as not to obstruct the screen 41, and in the illustrated embodiment, rests directly on the base 6 with its top generally being disposed at a lower level than the bottom of the viewing screen. Means are preferably provided whereby the inner casing 47 may be readily attached to and detached from the base 6. Thus, for example, the rearmost wall of this inner casing may be provided with bottom lugs 48, which when pivotally inserted through corresponding apertures 49 in the base 6, will fix the rear portion of the inner housing 47 relative to the outer housing 5, and the forward wall of this inner housing 47 may have its bottom portion flanged outwardly as at 50, with the toe of this flange being confined between the lower edge of the front wall of the outer housing and the juxtaposed bottom 6. If desired, registering ventilating apertures 51 may be provided in the side walls of casings 47 and 5.

In actual operation of the device illustrated in Figures 1, 2 and 3, the electric motor 17 drives wheel 12, causing the image-bearing film-cylinder 10 to rotate slowly on its supporting wheels.

As the images are conveyed past the framed aperture 33, they are projected by the train of projecting lenses 35 in the tube 34, and after being successively reflected by the mirrors 39 and 40, are finally cast upon the translucent viewing screen 41. It will be noted that during rotation of the cylinder 10, the transparent image-bearing portion thereof does not come in contact with any stationary member whatsoever, but on the contrary is free and clear of and spaced a substantial distance away from all neighboring fixed members. The cylinder may therefore be rotated an infinite number of times, and the images correspondingly projected an infinite number of times without the images ever becoming scratched, or worn, or otherwise deteriorating due to mechanical wear. The only portions of the cylinder 10 which may come in contact with other members are the upper and lower metal channel-strips 11, 11, which run in the peripheral grooves of the supporting and guiding wheels, and since these edge-reinforcing strips 11 may be constructed from metal or other durable material, no portion of the cylinder 10 need ever show any appreciable wear, even after extensive use of the cylinder.

Whenever it is desired to change the subject matter of the projected material, the film cylinder 10 inside the advertising device may be readily and easily replaced by another cylinder bearing a different series of images. Thus, the outer casing 5 may first be loosened from the base 6 by removing the screws 8, and then the outer casing 5 may be lifted, thereby freeing the front flange 50 of the inner casing 47. Inner casing 47 may then be tilted upwardly and rearwardly, to permit the lugs 48 to be slipped out of their apertures 49;—the lens-bearing tube 34 being first slid in or removed from its cradle 38 so as not to obstruct the casing 47. The overhead idler-wheel 23, where provided, may then be lifted away from the cylinder 10 against the force of its supporting spring 24, whereupon the old cylinder 10 may be readily lifted off its supporting wheels and another cylinder lowered in its place. The casings 47 and 5 may then be reassembled on the bottom 6 in reverse order, whereupon the device will be ready to project the new series of images onto the viewing screen.

In an alternative arrangement of the present invention, instead of the supporting wheel 12 being connected to an electric motor, this wheel may merely constitute an idler wheel, and other means may be provided for rotating the cylinder 10 over its supporting wheels without, however, subjecting the image-bearing surface of the cylinder to any mechanical wear.

The particular images borne by the cylinder 10 may constitute a generally continuous panorama, or they may comprise a series of separate pictures, or they may spell out a message, or they may comprise any desired combination of the foregoing.

In the particular embodiment of the present invention illustrated in Figures 4 and 5, the image-bearing cylinder carries a readily changeable message which may be projected onto the viewing screen against the background of those images which are permanently borne by the cylinder. Thus, this particular embodiment of the present invention may comprise a cylindrical strip of image-bearing film 57 having its opposed longitudinal edges bound with upper and lower metal channel-strips 58 and 59, with the upper channel-strip 58 resembling the upper channel 11 of the cylinder illustrated in Figures 1 and 3, but with the lower channel-strip 59 differing from the lower channel 11 of the foregoing embodiment in the inclusion of a relatively narrow annular flange 60 which is spaced slightly away from the transparent portion 57. This flange 60 may extend completely around the cylinder, exteriorly thereof as illustrated or, if desired, interiorly thereof, or it may merely extend along the circumferential portion or portions of the cylinder along which it is desired to position the removable images or characters.

The space between the flange 60 and the juxtaposed portion of the film 57 forms a groove or recess into which may be snugly positioned the basal portions 61 of the removable images or letters 62. These images 62 may constitute letters or characters which spell out a message, or they may constitute pictorial images or the like. If desired, their basal portion 61 may be provided at either end with extensions 63, which, when abutted against corresponding extensions of the adjacent letters, will insure proper spacing of the letters, or else these extensions 63 may be omitted and the task of properly spacing the individual letters left for the one assembling these images on the cylinder.

The removable images or letters may be cut out from any suitable opaque material, as illustrated in Figures 6 and 7, or else they may be opaquely printed or drawn or otherwise formed on square or rectangular sheets of transparent material 64, as illustrated in Figure 8. In this latter figure, the numeral 65 represents the opaque letter or character, and the numeral 66 represents the basal portion of the sheet which is intended to be slipped into the groove behind the flange 60 to hold the image in position.

The particular form of construction of the individual removable letters or characters may be varied widely from those forms illustrated in the accompanying drawings, without departing from the scope of the present invention. Thus, if desired, the removable images or letters of the message may be made to stand out light against a dark background, as for instance by constructing the rectangular sheet 64 shown in Figure 8 with its transparent and opaque zones transposed, that is to say, with all of sheet 64 being printed or otherwise rendered opaque except for the image or letter portion 65 which is left transparent. Another manner in which the letters of the message may be constructed to stand out light against a dark background is by cutting out the letter from an opaque sheet in stencil-like fashion, and then placing the perforated opaque sheet on the cylinder.

The images carried by the transparent material may be applied thereto in any suitable manner, as for instance by being printed, painted, impressed, drawn, or adhesively secured thereto. In actual practice, I have found that these images, either scenic or letter, may be very satisfactorily printed on a Celluloid sheet by the silk-screen printing process.

Although in the accompanying drawings, the letters which spell out the message have been shown as being separately removable, it is to be expressly understood that if desired a plurality of permanently united letters or characters may be jointly formed from a single sheet of material. Thus, if desired, the words of the message may be constructed each from a single sheet of material, so that they may be inserted or extracted each as a unit, or if desired the entire message may be formed from a single continuous strip of material for ready insertion and removal.

By means of the foregoing, different messages may be projected onto the viewing screen with the use of but one cylinder, and these messages may be readily and easily changed when desired.

The particular arrangement of elements of the advertising device illustrated in the accompanying drawings may be varied without departing from the scope of the present invention. Thus, if desired, the reflecting mirrors 39 and 40 may be dispensed with, and the images which are projected through the tube 34 may be cast directly onto either a translucent viewing screen, which may or may not be connected directly to the housing 47, or the images may be cast directly onto a reflecting screen operatively positioned a suitable distance away. Again, instead of casting the images onto a translucent screen 41, as illustrated in Figure 1, the images may be cast onto a reflecting screen operatively positioned any suitable distance away from the apparatus.

In the embodiment diagrammatically illustrated in Figure 9, the projecting device is provided with a pair of horizontally-spaced vertical reflecting mirrors 67 and 68 disposed adjacent the opposed side-walls of the casing 5, in lieu of the vertically-spaced mirrors of the foregoing embodiment. In this instance, the optical axis of the projecting means is not parallel with the longitudinal axis of the casing 5, as in the preceding embodiment, but instead forms an angle therewith, sufficient to project the images onto the mirror 67 which is disposed adjacent one of the side-walls of said casing. This mirror 67 reflects the projected image in a transverse direction onto the juxtaposed mirror 68, which in turn reflects the images onto the translucent viewing screen 41. Although this screen 41 is illustrated in Figure 9 as being mounted in the casing 5, it is to be understood that this translucent screen may be supported a suitable distance away from the projecting apparatus by means separate and distinct from, and outside of, the housing 5. A transverse partition wall 69 or its equivalent may be provided in this particular embodiment in order to shield the mirrors and screen from any stray light. Here again, if desired, the translucent viewing screen 41 may be dispensed with, and the images instead reflected onto a reflecting screen positioned a suitable distance away from mirror 68.

In another form of construction, the last mirror 68 may be so arranged as to reflect the images in a direction more or less opposite that shown in Figure 9, so that the images may pass to one side of the image-bearing cylinder 10 on their way towards the viewing screen, which in this instance will be positioned at the opposite end of the apparatus.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. A device of the character described including a base, a plurality of rotatably-mounted transversely-fixed wheels arranged at intervals along the circumference of a circle parallel to said base with their axes extending in a radial direction, and having their top portions lying at substantially the same elevation, a transparent image-bearing cylinder resting on the tops of said wheels and supported thereby, one of said wheels being connected to a driving motor thereby to rotate said cylinder, means resiliently urging said cylinder down against the driven wheel, a source of illumination inside said cylinder arranged to cast its rays outwardly therethrough, an inner casing detachably secured to said base and having an apertured rear wall, said inner casing generally completely enclosing said image-bearing cylinder and said source of illumination, a tube extending through the aperture in the rear wall of the inner casing and bearing projector lens means for projecting the images borne by said cylinder, an upwardly inclined mirror disposed rearwardly of said tube and arranged to reflect projected images generally upwardly, a juxtaposed downwardly inclined mirror disposed above said first-mentioned mirror and in the path of the reflected images, said last-mentioned mirror being arranged to reflect said images generally forwardly, and an outer casing secured to said base completely housing said inner casing and said mirrors, said inner casing confining the light rays emitted by said source of illumination and prohibiting any light from entering the space between said inner and outer casings except through said tube, said outer casing bearing a relatively large-sized aperture at an elevation above the top of said inner casing, and a translucent viewing screen associated with said aperture and arranged to intercept the images reflected forwardly from said second mirror.

2. An advertising device of the character described including a base, a plurality of wheels rotatably supported a fixed distance above said base, said wheels being circularly arranged with their axes each extending in a radial direction, one of said wheels being connected to a driving motor, a transparent image-bearing cylinder having its lower edge resting on the top portions of said wheels, rotatable means resiliently urging said cylinder down against the driven wheel, a source of illumination inside said cylinder arranged to cast its rays outwardly therethrough, projector lens means outside and rearwardly of said cylinder for projecting the images borne thereby, an upwardly inclined mirror disposed rearwardly of said projector lens means and arranged to reflect the projected images generally upwardly, a juxtaposed downwardly inclined mirror disposed above said first-mentioned mirror and in the path of the reflected images, said last-mentioned mirror being arranged to reflect said images generally forwardly, and a casing detachably secured to said base and housing all the aforesaid elements, said casing including a front wall bearing an aperture disposed generally in the path of the images reflected forwardly from said last-mentioned mirror, and a translucent viewing screen associated with said aperture for intercepting the images reflected from said last-mentioned mirror.

3. An image-projecting device including a generally flat rectangular base portion flanged upwardly along its periphery, a removable outer casing resting on said base portion with its lowermost marginal portions lying inside and adjacent the peripheral flange on said base portion, said outer casing including a front wall having an aperture in its upper portion and a translucent viewing screen associated with said aperture, image-projecting means mounted on said base portion and disposed below the level of said viewing screen, a removable inner casing generally completely housing said projecting means and bearing an opening through which the images may be projected, said inner casing having outwardly extending lugs at its bottom rear portion insertable through corresponding apertures in said base portion, and said inner casing having a forwardly-extending flange at its bottom front portion abutting against the juxtaposed upwardly-extending flange of the base portion and lying underneath the bottom edge of the front wall of the outer casing, and image-reflecting means exteriorly of said inner casing and interiorly of said outer casing arranged to reflect the images projected from said inner casing onto said translucent viewing screen.

4. In a device of the character described, three rotatable transversely-fixed wheels arranged at intervals along a given circle with their axes each extending in a generally radial direction, and having their top portions lying at substantially the same elevation, a generally annular strip of film having its two side edges bound with metal strips, the lowermost metal strip resting on the top portions of said wheels, an electric motor driving one of said wheels, a fourth wheel disposed above and in generally the same plane as the driven wheel and having its lower portion contacting the uppermost metal strip, and spring means urging said fourth wheel downwardly against said uppermost metal strip, thereby to increase the traction between the motor-driven wheel and the lowermost metal strip, said strip of film being out of contact with said wheels.

5. In a device of the character described having means for projecting images onto a viewing screenfi a plurality of wheels arranged at intervals along the circumference of a circle, with their top portions lying in generally the same horizontal plane, said wheels each being disposed in a vertical plane generally tangent to said circle, the outer peripheries of said wheels being grooved, a transparent image-bearing cylinder having its lower edge rotatably resting on said wheels in the grooved peripheral portions thereof, a portion of said image-bearing cylinder being disposed within operative range of said image-projecting means, driving means connected with one of said wheels for rotating the same thereby to rotate said cylinder, a juxtaposed wheel disposed above said driven wheel and having a grooved periphery engaging the opposite upper edge of said image-bearing cylinder, and means resiliently urging said last-mentioned wheel downwardly against said cylinder.

6. In a device of the character described having means for projecting images onto a viewing screen, a strip of image-bearing film having its opposite longitudinal edges encased in metal binding strips, and means for moving said strip of film past said image-projecting means comprising a plurality of wheels, disposed on opposite sides of said film and each lying in generally the same plane as the juxtaposed portion of said film, at least one of said wheels being connected to a driving motor, the outer peripheries of said wheels being grooved to receive the metal binding strips along the edges of said film, said wheels being out of contact with said strip of film, and means resiliently urging wheels on opposite sides of said film relatively towards each other.

7. In an advertising device of the character described, a transparent image-bearing cylinder having a metal binding strip at one edge, a flange integral with said strip projecting therefrom in spaced relation from and generally parallel with the wall of said cylinder and forming therewith a groove along the portion of said cylinder adjacent to said edge, and a plurality of letters removably associated with said transparent cylinder and comprising a message, said letters each being constructed from a sheet of material having a basal portion slidable into and out of said groove.

8. A device of the character described, comprising an outer case having a translucent screen, an inner casing removably positioned within said outer case, a continuous strip of relatively perishable film bent into the shape of a cylinder and having its opposite side edges bound in metal, said cylinder being rotatably and rigidly mounted within said inner casing, an electric motor, means for rotating said cylinder including a direct positive drive from said electric motor to one of the bound edges of said cylinder, an electric light disposed within said cylinder, a condensing lens disposed within said cylinder intermediate said electric light and said cylinder, a focusing lens passing through and supported by said inner casing, said focusing lens being positioned adjacent to the outer side of said cylinder and in line with said condensing lens and reflecting means external to said inner casing and adapted to reflect the light from said focusing lens to said screen.

HENRY M. RUNDLE.